(12) United States Patent
Charry et al.

(10) Patent No.: US 11,341,359 B2
(45) Date of Patent: May 24, 2022

(54) MULTI-DOMAIN MONITORING SERVICES FOR INTELLIGENT INFRASTRUCTURE AUTOMATION

(71) Applicant: EMC IP Holding Company LLC, Hopkinton, MA (US)

(72) Inventors: Valerie Charry, Melrose, MA (US); James R. King, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 245 days.

(21) Appl. No.: 16/518,507

(22) Filed: Jul. 22, 2019

(65) Prior Publication Data

US 2021/0027091 A1    Jan. 28, 2021

(51) Int. Cl.
| | | |
|---|---|---|
| G06K 9/62 | (2022.01) | |
| G06F 16/23 | (2019.01) | |
| G06F 16/2458 | (2019.01) | |
| H04L 41/22 | (2022.01) | |
| H04L 41/12 | (2022.01) | |

(Continued)

(52) U.S. Cl.
CPC ....... G06K 9/6224 (2013.01); G06F 16/2343 (2019.01); G06F 16/2465 (2019.01); G06K 9/6257 (2013.01); H04L 41/12 (2013.01); H04L 41/16 (2013.01); H04L 41/22 (2013.01); H04L 67/16 (2013.01)

(58) Field of Classification Search
CPC .... G06K 9/6224; G06K 9/6257; H04L 41/16; H04L 67/16; H04L 41/22; H04L 41/12; H04L 41/145; G06F 16/2343; G06F 16/2465
See application file for complete search history.

(56) References Cited

U.S. PATENT DOCUMENTS

2008/0222287 A1 * 9/2008 Bahl ............... H04L 41/12
709/224
2010/0192013 A1 * 7/2010 Krishnan .......... H04L 41/065
714/26

(Continued)

OTHER PUBLICATIONS

Wikipedia, "OSI Model," https://en.wikipedia.org/wiki/OSI_model, Jul. 17, 2019, 6 pages.

Primary Examiner — John A Follansbee
Assistant Examiner — Lam T Do
(74) Attorney, Agent, or Firm — Ryan, Mason & Lewis, LLP

(57) ABSTRACT

Data points are collected from multiple infrastructure domains of at least one data center in a computing environment. A graphical representation is generated from the collected data points that represents an infrastructure state of the at least one data center, wherein each vertex in the graphical representation corresponds to one of one or more compute components, one or more storage components, and one or more network components of the data center, and an edge connecting two vertices corresponds to a relationship between the components to which the vertices correspond. The graphical representation representing the infrastructure state of the at least one data center is sent to an infrastructure generation engine for composition with one or more other graphical representations respectively representing the infrastructure state of one or more other data centers in the computing environment.

20 Claims, 5 Drawing Sheets

(51) Int. Cl.
*H04L 67/51* (2022.01)
*H04L 41/16* (2022.01)

(56) References Cited

U.S. PATENT DOCUMENTS

| | | | |
|---|---|---|---|
| 2015/0007171 A1* | 1/2015 | Blake | G06F 9/45558 |
| | | | 718/1 |
| 2017/0085446 A1* | 3/2017 | Zhong | H04L 41/12 |
| 2017/0357828 A1* | 12/2017 | Phillips | G06F 16/00 |
| 2018/0219752 A1* | 8/2018 | Wang | G06F 16/2445 |
| 2020/0382396 A1* | 12/2020 | Scott | H04L 1/20 |

* cited by examiner

MULTI-DOMAIN MONITORING SERVICES FOR INTELLIGENT INFRASTRUCTURE AUTOMATION

FIELD

The field relates generally to computing environments, and more particularly to infrastructure management in such computing environments.

BACKGROUND

Computing environments frequently employ cloud computing platforms, where "cloud" refers to a collective computing infrastructure that implements a cloud computing paradigm. For example, cloud computing is a model for enabling ubiquitous, convenient, on-demand network access to a shared pool of configurable computing resources (e.g., compute, memory, storage) that can be rapidly provisioned and released with minimal management effort or service provider interaction.

Enterprises such as corporations typically utilize a cloud computing environment to manage their applications, services and data. One or more cloud platforms that are part of this environment may be within the exclusive control and management of the enterprise, and therefore are considered "private clouds." On the other hand, the cloud computing environment can include one or more cloud platforms that can be used by multiple enterprises (tenants or customers), and that are not necessarily controlled or managed by any of the multiple enterprises but rather are controlled and managed by one or more third-party cloud providers. Such cloud platforms are typically considered "public clouds." More typically, enterprises may choose to host their applications, services and data on a combination of multiple clouds that form a "multi-cloud computing environment." A multi-cloud computing environment that includes one or more public clouds and one or more private clouds is sometimes referred to as a "hybrid cloud computing environment." Note also that one or more cloud platforms can form what is known as a "data center." Thus, in some scenarios, a multi-cloud computing environment can include multiple data centers. Data centers can also be implemented without cloud computing infrastructure or some combination of a cloud computing and non-cloud computing infrastructure. However, management of data center infrastructure can present significant challenges.

SUMMARY

Embodiments of the invention provide techniques for automated infrastructure management in a computing environment.

For example, in one embodiment, a method comprises the following steps. Data points are collected from multiple infrastructure domains of at least one data center in a computing environment, wherein a first infrastructure domain comprises one or more compute components, a second infrastructure domain comprises one or more storage components, and a third infrastructure domain comprises one or more network components. A graphical representation is generated from the collected data points that represents an infrastructure state of the at least one data center, wherein each vertex in the graphical representation corresponds to one of the one or more compute components, the one or more storage components, and the one or more network components, and an edge connecting two vertices corresponds to a relationship between the components to which the vertices correspond. The graphical representation representing the infrastructure state of the at least one data center is sent to an infrastructure generation engine for composition with one or more other graphical representations respectively representing the infrastructure state of one or more other data centers in the computing environment.

Advantageously, illustrative embodiments provide for methods of leveraging graph theory concepts, semantics, and algorithms, modeling multi-domain infrastructure systems as vertices and edges in a graphical representation. Such graphs present information in a format that is queryable and provide a more complete view of the state of a data center in order to improve the efficiency when performing management operations. This representation of one or more data centers also enables the application of graph algorithms across domains and provides an efficient way to calculate costs in a data center.

These and other features and advantages of the invention will become more readily apparent from the accompanying drawings and the following detailed description.

DETAILED DESCRIPTION

Figure 1:
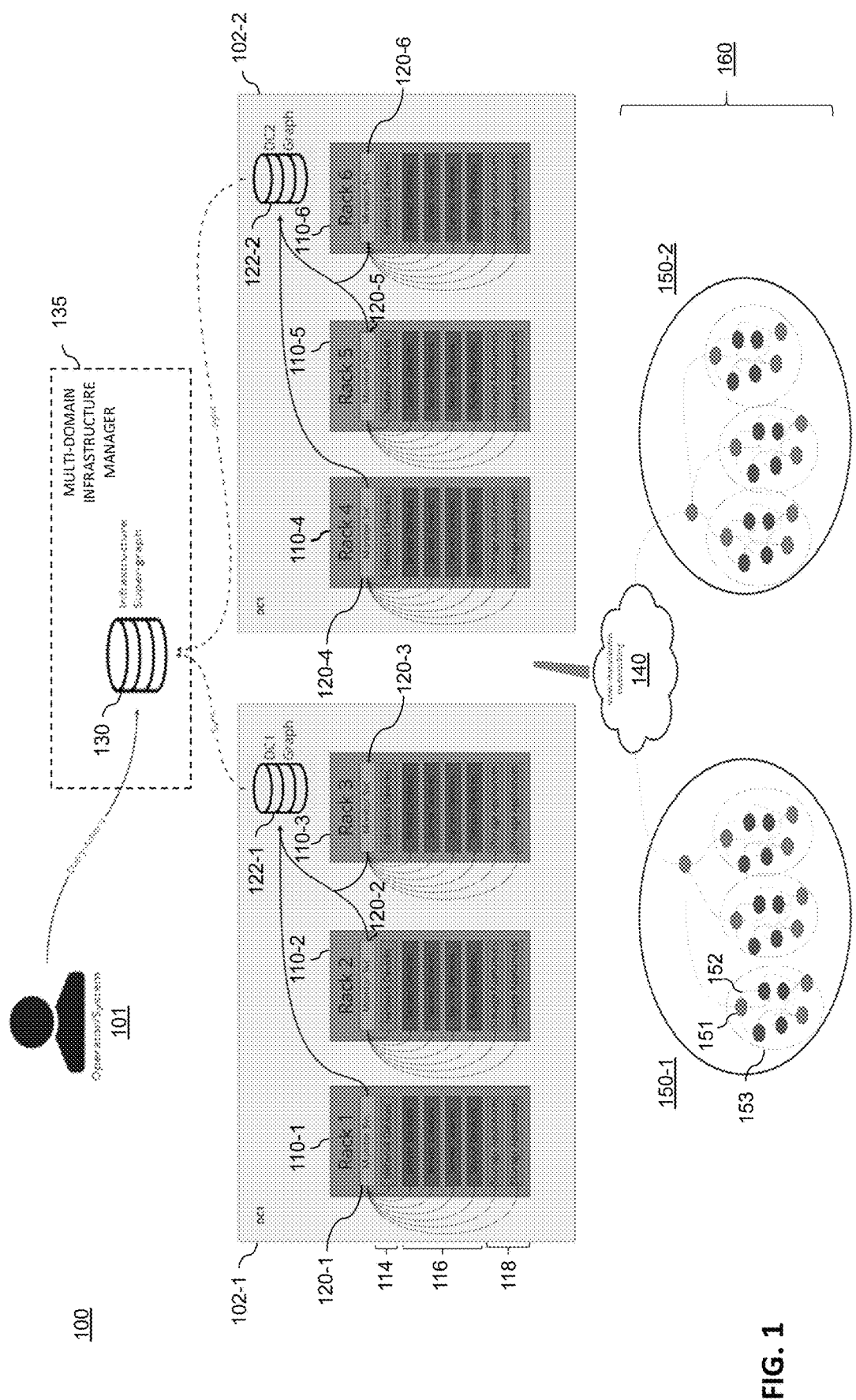
FIG. 1 is a block diagram of a computing environment with automated infrastructure management functionality, according to an embodiment of the invention.

Illustrative embodiments may be described herein with reference to exemplary cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

Data center management today is made up of many different products from various vendors across several domains. The term "domains" illustratively refers to infrastructure for different functions in the data center environment. For example, a multi-domain data center environment can have domains including, but not limited to, a compute domain (e.g., comprising server devices and other host computing devices), storage domain (e.g., comprising storage appliances, storage arrays and storage devices), and a networking domain (e.g., comprising network devices such as routers and switches). Each domain is different and can have a myriad of different functions, features, and capacities such that a data service executed by the data center involves multiple domains. However, in existing data centers, management technology provides a singular or extremely scoped view of the data center infrastructure. Any gap is typically bridged via the human element of data center operations (e.g., administrators or other human operators).

This existing approach is incompatible with emerging goals of completely autonomous data centers. For example, in order to enable infrastructure management for application programs such as Artificial Intelligence/Machine Learning (AI/ML) applications, a complete model of the data center and additional neighboring participants in data center operations should be created.

It is realized herein that efficient allocation of hardware resources in a modern data center involves an understanding of connectivity and interactions across several domains. From the perspective of an information technology (IT) operator, understanding this multi-domain space can be difficult and correlating information across these disparate systems overwhelming. For example, an operator may need to allocate hardware resources for a team that needs to run a compute-intensive workload on a large data set. Without proper modeling of the data center, this workload placement could be inefficient, costing the company time and valuable resources.

Further, it is realized that current automation technologies can only operate on data that is observable via a single source. These technologies are unable to observe the ramifications of automation tasks on neighboring infrastructure and frequently cause outages or performance issues by doing tasks without a full understanding of the causal relationships.

Illustrative embodiments address the above and other challenges by providing automated infrastructure management in a computing environment. More particularly, illustrative embodiments leveraging graph theory concepts, semantics, and algorithms, modeling multi-domain infrastructure systems as vertices and edges in a graphical representation. Such graphs present information in a format that is query-able and provide a more complete view of the state of a data center in order to improve the efficiency when performing management operations. This representation of a data center also enables the application of graph algorithms across domains and provides an efficient way to calculate costs in a data center.

In one or more illustrative embodiments, disaggregated monitoring services are deployed across the data center to feed the overall graph state. Both temporal and spatial data points are collected by the services to provide a near consistent view of the entire data center infrastructure at any given point in time. Observability is paramount to the overall graph quality. In one or more illustrative embodiments, when referring to temporal data points versus spatial data points, it is a differentiation between time-series data (things that change over time and thus are considered temporal) versus inventory data (things that do not change or change infrequently and thus are considered spatial). Sample temporal data may include, but is not limited to, data points comprising: performance data/metrics (e.g., utilization, per second measurements, etc.); power utilization data; monitoring data (e.g., voltage, temperature, error states). Sample spatial data may include, but is not limited to, data points comprising: location data (e.g., geographic with latitude/longitude to enable polar coordinate calculations); serial numbers; part numbers; inventory data (e.g., child devices, current software versions, etc.); state inventory data (e.g., current operating system, current applications—this could be temporal in some instances).

A superset graph (super-graph) is maintained that is a composition of individual site sub-graphs. The individual site sub-graphs focus on lower layers of infrastructure to the Open Systems Interconnection (OSI) Network Model (primarily layer 1 & layer 2). Layers 3+ are maintained within the superset graph which facilitates multi-data center deployments and stretched cluster concepts with minimal effort beyond an observer that links the native technology to specific spatial boundaries.

Note that the OSI Network Model is a model that conceptually characterizes communication functions of a communication system such as, but not limited to, a 5G network. The OSI Network Model is typically conceptualized as a hierarchical stack with a given layer serving the layer above and being served by the layer below. Typically, the OSI Network Model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Further, in terms of temporal data sets, utilization data is collected and assigned to all vertices and edges within the context of that technology space. The data itself is aggregated and summarized into cross-domain weights that facilitate contextual traversals based on higher-order use cases. For example, in one or more embodiments, cross-domain weight assignment is an aggregate value determined from compressing all graph layers into one view. A sample graphing algorithm is A* or Djikstra's Algorithm which does path cost minimization across a two-dimensional graph. Performance of such algorithms includes a compression of layers into these cross-domain weights and then allowing a sub-graph traversal to occur. The weight is arbitrary/implementation-specific but the feeders are expressed below. An example would be how to effectively highlight limiting factors. A network connected storage device may report a utilization of 50% but the underlying network connection may report a utilization of 100%. The cross-domain utilization report would be 100% since the dependency would be discernable in the graph and the limiting factor could be presented for a raw performance scenario.

This infrastructure monitoring combined with contextual relationship data in graph format enables powerful queries and traversal mechanisms. Some exemplary questions that can be answered from a graph representation generated in accordance with illustrative embodiments include, but are not limited to:

What are the most/least utilized devices? (ability to filter by compute/storage/network type)

Where are they? (geolocation)

Does a path between device A and device B exist? Is it within the same data center? Rack? Cost?

What is the nearest storage device to device A that has X amount of storage available? Least utilized?

What links are the most/least utilized? Where are they?

What is the closest device from X that meets requirements A, B, C?

Additional layering of the data with application context provides instant answers to the ramifications of network outages and even determine potential redundancy concerns within a data center. The overall query power for infrastructure becomes practically limitless.

Still further, in one or more illustrative embodiments, during graph queries and traversals, ideal subgraphs are near instantly generated via existing storage snapshot technologies to ensure a consistent state of the infrastructure. Illustrative embodiments also align a subgraph locking mechanism to fence (or lock) infrastructure from change during query and action steps.

As a complete solution, this improved infrastructure management is an important building block required for AWL based data center operations. Combined with the ability to create snapshots of current state and desired state via current snapshot technologies, providing this functionality initially to human end-users and tracking graph changes, a data center training model for the AWL operator is achieved. This improved infrastructure management functionality can additionally be aligned with Dell EMC Secure Remote Support or EMRS (Dell EMC, Hopkinton MA) to return the snapshots to an enterprise to train product models. Current storage array technologies facilitate instant snapshot generation via Copy-on-Write (CoW) semantics which provides a mechanism for generating a 100% copy of the graph as needed in a very efficient way. In illustrative embodiments, a high-level manager (e.g., as will be illustrated and described below as multi-domain infrastructure manager 135) can be configured to delegate CoW semantics to graph changes which would allow delta generation and submission back to a given enterprise providing the support (e.g., Dell EMC).

The interpretation of data from disparate infrastructure systems and domains as vertices and edges in a graph is unique by attempting to break down the walls across domains that have been operating in silos and provide a domain-agnostic representation of the data center. With a model, such as one generated in accordance with one or more illustrative embodiments, in place enabling the use of graph algorithms, data center costs can be calculated more efficiently and accurately. Emerging research in the optimizations of graph calculations and computations has made the implementation of these concepts feasible.

By tagging the vertices and edges with telemetry about utilization or power consumption as weights, in one or more illustrative embodiments, an implementation of a Shortest Path algorithm calculates the cost of resource allocation and/or prioritizes the allocation of underutilized resources. With the rise of multi-model databases and their powerful query languages, the ability to store and query this information becomes more efficient and flexible than the traditional relational models used in current product offerings.

FIG. 1 is a block diagram of a computing environment 100 with automated infrastructure management functionality in a computing environment, according to an embodiment of the invention. As shown, a first data center 102-1 is operatively coupled to a second datacenter 102-2. The two data centers 102-1 and 102-2 are coupled by inter data center networking 140.

The infrastructure of the first data center 102-1 comprises three racks 110-1 (Rack 1), 110-2 (Rack 2) and 110-3 (Rack 3). Each rack comprises one or more network devices 114, one or more server devices 116 and one or more storage appliances 118. Compute, storage and network components 114, 116, 118 from each rack report to a monitoring service 120 (120-1 in Rack 1, 120-2 in Rack 2 and 120-3 in Rack 3). Each monitoring service 120 sends data to a graph generation engine 122-1. Graph generation engine 122-1 generates a graph 150-1 from the infrastructure monitoring data received from the various monitoring services 110-1, 110-2 and 110-3. For example, within graph 150-1 (which may be considered a relative flattened topology view), each compute, storage and network component 114, 116, 118 is represented by a vertex 151 wherein two vertices are interconnected by an edge 152. Each rack 110-1, 110-2 and 110-3 is represented as a larger circle 153. Graph generation engine 122-1 synchronizes with an infrastructure super-graph generation engine 130. By synchronize, in illustrative embodiments, it is meant that the graph generation engine 122-1 provides the sub-graph generated locally at the data center 102-1 to infrastructure super-graph generation engine 130.

Similarly, the infrastructure of the second data center 102-2 comprises three racks 110-4 (Rack 4), 110-5 (Rack 5) and 110-6 (Rack 6). Each rack comprises one or more network devices 114, one or more server devices 116 and one or more storage appliances 118. Compute, storage and network components 114, 116, 118 from each rack report to a monitoring service 120 (120-4 in Rack 4, 120-5 in Rack 5 and 120-6 in Rack 6). Each monitoring service 120 sends data to a graph generation engine 122-2. Graph generation engine 122-2 generates a graph 150-2 from the infrastructure monitoring data received from the various monitoring services 110-4, 110-5 and 110-6. The vertices and edges in graph 150-2 (which may be considered a relative flattened topology view) represent the components in the second data center 102-2 in a similar manner as explained above for graph 150-1. Graph generation engine 122-2 synchronizes with the infrastructure super-graph generation engine 130. By synchronize, in illustrative embodiments, it is meant that the graph generation engine 122-2 provides the sub-graph generated locally at the data center 102-1 to infrastructure super-graph generation engine 130.

Note that 150-1 and 150-2 are subgraphs and together (as depicted in FIG. 1) they represent a flattened topology super-graph 160 generated from the subgraphs by infrastructure super-graph generation engine 130.

Note that, in some embodiments, infrastructure super-graph generation engine 130 can be implemented in its own computing device remote from either data center 102-1 or 102-2, and in other embodiments, it can be implemented in one of the data centers or across both data centers.

Note further that the infrastructure super-graph generation engine 130 is part of a multi-domain infrastructure manager 135 in illustrative embodiments.

Note also that while FIG. 1 shows only two data centers and only three infrastructure racks in each data center, it is to be understood that this is for illustrative purposes and thus embodiments are not so limited and apply to computing environments with more or fewer data centers and racks/components therein.

As mentioned above, monitoring services 120 are disaggregated monitoring services deployed across the computing environment 100 to feed the overall graph state. Both temporal and spatial data points are collected by the monitoring services 120 from the compute, storage and network components (114, 116 and 118) to provide a near consistent view of the given data center at any given point in time. Infrastructure super-graph generation engine 130 obtains synchronized data from each graph generation engine 122 to generate and maintain a super-graph that is a composition of individual data center sub-graphs. In some embodiments, the individual data center sub-graphs focus primarily on OSI layer 1 and layer 2, while OSI layers 3+ are maintained within the superset graph. Further, as mentioned above, utilization data is collected and assigned to all vertices 151 and edges 152 within the context of that technology space. The data itself is aggregated and summarized into cross-domain weights that facilitate contextual traversals based on higher-order use cases.

As mentioned above, infrastructure monitoring combined with contextual relationship data in graph format enables powerful queries and traversal mechanisms. As shown in FIG. 1, an IT operator or system 101 queries infrastructure super-graph generation engine 130 to access one or more graphs and to effectuate one or more graph operations.

Figure 2A:
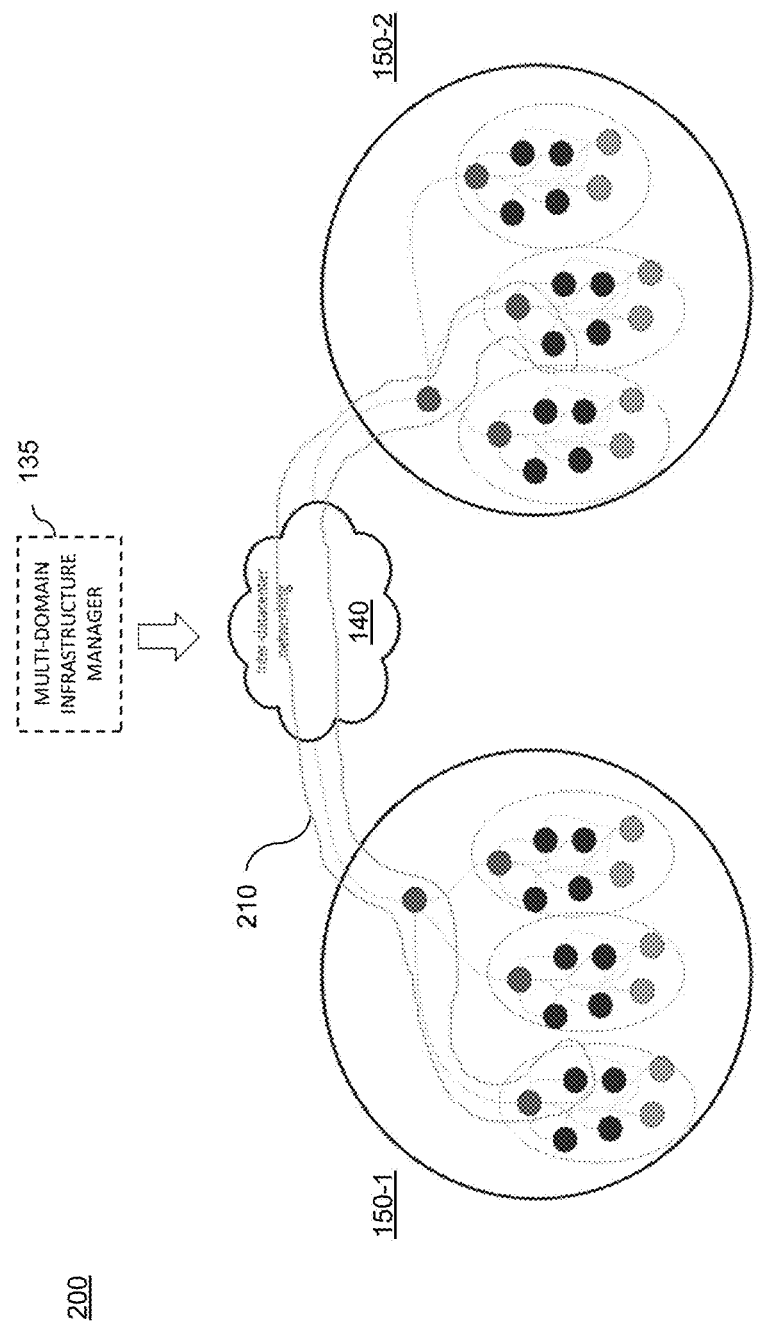
FIG. 2A is a diagram of a graphical representation illustrating a lock feature for a computing environment with automated infrastructure management functionality, according to an embodiment of the invention.

Turning to FIG. 2A, a subgraph locking mechanism is depicted to fence or lock infrastructure from change during query and action steps. More particularly, graphic 200 depicts graph 150-1 (graphical representation of first data center 102-1) and graph 150-2 (graphical representation of second data center 102-2) coupled via inter data center networking 140. As further shown in the graphic 200, a fencing 210 of components in the form of a distributed cross-domain lock is formed to allow dependency determination, i.e., which components 114, 116 and 118 depend on which other components 114, 116 and 118.

It is to be appreciated that the graph generation engines 122-1 and 122-2 are configured with data stores that are tightly integrated to storage appliances 118 with a storage snapshot adapter to create instant sub-graphs for atomicity.

Figure 2B:
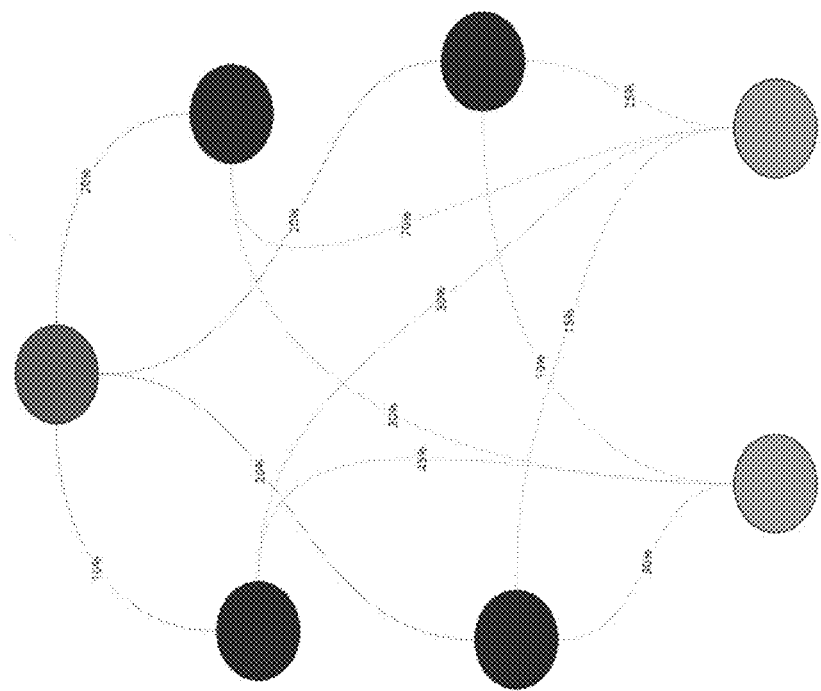
FIG. 2B is a diagram of a graphical representation illustrating annotations based on spatial and temporal data points for a computing environment with automated infrastructure management functionality, according to an embodiment of the invention.

FIG. 2B is a diagram of a graphical representation 250 generated, for example, by one of engines 122-1, 122-2 or 130 in accordance with one or more illustrative embodiments. More particularly, the graphical representation 250 illustrates annotations based on spatial and temporal data points collected by one or more monitoring services 120. Each node has similar data available from the monitoring services in order to enable application-specific algorithms to leverage properties of the data. As mentioned, data can include spatial data (e.g., geographic coordinates, height of rack in which one or more compute, storage, network components reside, unique rack location and/or data center location) and temporal data (e.g., temperature (22 degrees Celsius), storage capacity (70%), utilization (25%), power (124 Watts)). Some or all of this data may be assigned and annotated on edges connecting nodes (e.g., cross-domain utilization percentages (weights) shown on edges in FIG. 2B).

Figure 3:
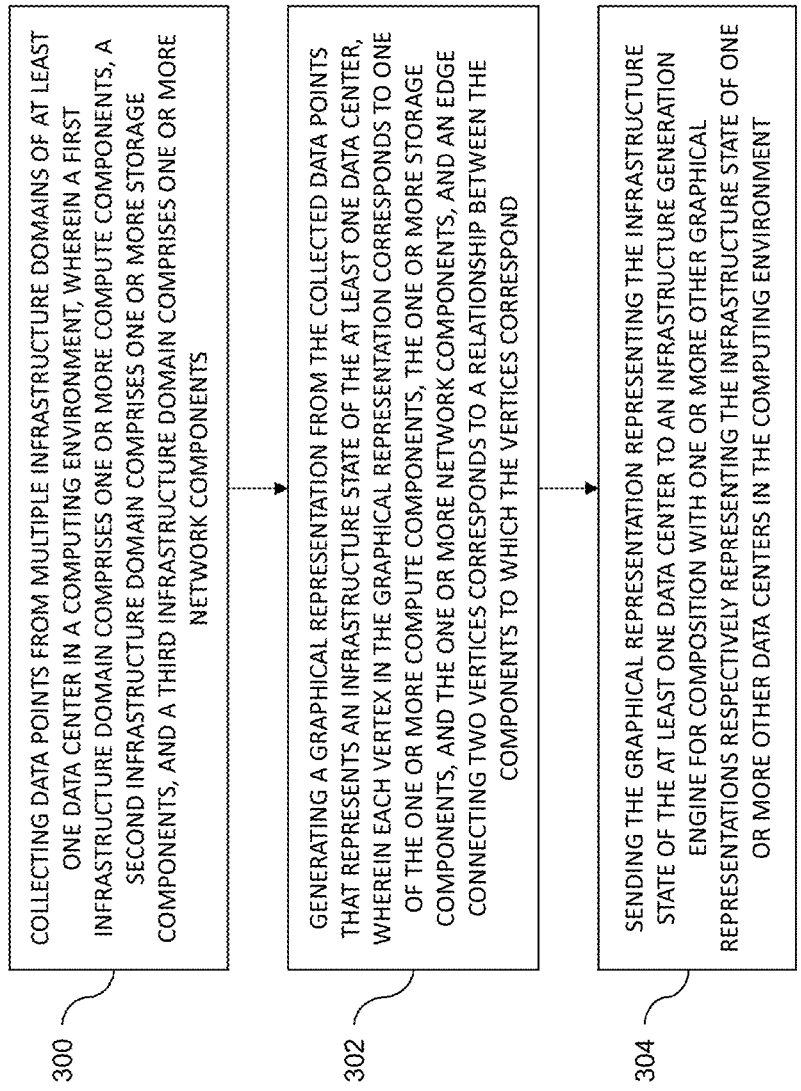
FIG. 3 is a flow diagram of an automated infrastructure management methodology in a computing environment, according to an embodiment of the invention.

FIG. 3 is a flow diagram of an automated infrastructure management methodology in a computing environment, according to an embodiment of the invention.

As shown, in step 300, data points are collected from multiple infrastructure domains of at least one data center in a computing environment, wherein a first infrastructure domain comprises one or more compute components, a second infrastructure domain comprises one or more storage components, and a third infrastructure domain comprises one or more network components.

In step 302, a graphical representation is generated from the collected data points that represents an infrastructure state of the at least one data center, wherein each vertex in the graphical representation corresponds to one of the one or more compute components, the one or more storage components, and the one or more network components, and an edge connecting two vertices corresponds to a relationship between the components to which the vertices correspond.

In step 304, the graphical representation representing the infrastructure state of the at least one data center is sent to an infrastructure generation engine for composition with one or more other graphical representations respectively representing the infrastructure state of one or more other data centers in the computing environment.

The particular processing operations and other system functionality described in conjunction with FIGS. 1, 2A, 2B and 3 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

The following are some non-limiting illustrative use cases with which the above-described automated infrastructure management architecture and methodologies can be applied in some embodiments.

Use Case 1: Service Providers Increase Operational Efficiency

Service providers can purchase offerings from an enterprise (e.g., Dell EMC) that can advertise the states and connections of the hardware resources and provide visibility as to the performance and utilization across several domains. Their data center operators would have the capabilities to search and allocate resources with ease while also being able to optimize capacity planning. This would also help in debugging problems or failures and limiting outages.

Use Case 2: Dell EMC PowerEdge Open Manage Enterprise (OME) Integration

Integration with the existing OME collateral for the collector technology and an initial read-only implementation. This would be ideal in providing initial data sets to internally data mine and even expose back to the customer for value-add and/or additional revenue. The OME installation could host a simple sub-graph component of the overall graph which would be hosted by Dell EMC and provided as a Software-as-a-Service (SaaS) offering.

Figure 4:
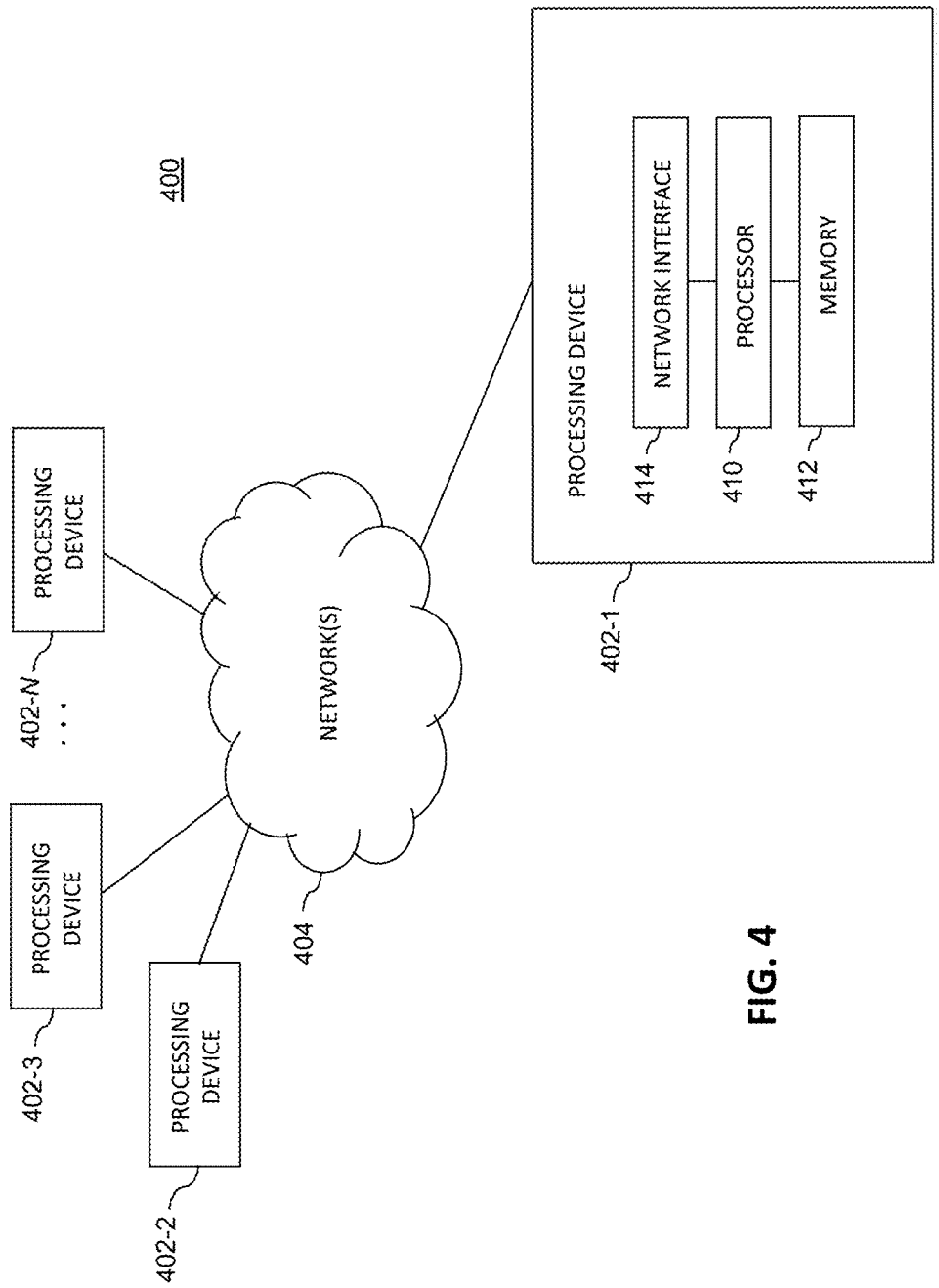
FIG. 4 illustrates a processing platform used to implement a computing environment with automated infrastructure management functionality, according to an embodiment of the invention.

FIG. 4 illustrates a processing platform used to implement a computing environment with automated infrastructure management functionality, according to an embodiment of the invention. More particularly, processing platform 400 is a processing platform on which a multi-cloud computing environment with improved data management functionalities (e.g., FIGS. 1, 2A, 2B and 3 and otherwise described herein) can be implemented.

The processing platform 400 in this embodiment comprises a plurality of processing devices, denoted 402-1, 402-2, 402-3, . . . 402-N, which communicate with one another over network(s) 404. It is to be appreciated that the methodologies described herein may be executed in one such processing device 402, or executed in a distributed manner across two or more such processing devices 402. It is to be further appreciated that a server, a client device, a computing device or any other processing platform element may be viewed as an example of what is more generally referred to herein as a "processing device." As illustrated in FIG. 4, such a device generally comprises at least one processor and an associated memory, and implements one or more functional modules for instantiating and/or controlling features of systems and methodologies described herein. Multiple elements or modules may be implemented by a single processing device in a given embodiment. Note that each of the one or more centralized computing networks 110, the one or more edge computing networks 120, and edge data management engine 130 can comprise one or more of such processing devices 402 shown in FIG. 4. The network(s) 404 represent one or more communications networks that enable 110, 120 and 130 to communicate and to move data therebetween, as well as to perform other functionalities described herein.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 410. Memory 412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 412 may comprise electronic memory such as random-access memory (RAM), read-only memory (ROM) or other types of memory, in any combination. The one or more software programs when executed by a processing device such as the processing device 402-1 causes the device to perform functions associated with one or more of the components/steps of system/methodologies in FIGS. 1, 2A, 2B and 3. One skilled in the art would be readily able to implement such software given the teachings provided herein. Other examples of processor-readable storage media embodying embodiments of the invention may include, for example, optical or magnetic disks.

Processing device 402-1 also includes network interface circuitry 414, which is used to interface the device with the networks 404 and other system components. Such circuitry may comprise conventional transceivers of a type well known in the art.

The other processing devices 402 (402-2, 402-3, . . . 402-N) of the processing platform 400 are assumed to be configured in a manner similar to that shown for computing device 402-1 in the figure.

The processing platform 400 shown in FIG. 4 may comprise additional known components such as batch processing systems, parallel processing systems, physical machines, virtual machines, virtual switches, storage volumes, etc. Again, the particular processing platform shown in this figure is presented by way of example only, and the system shown as 400 in FIG. 4 may include additional or alternative processing platforms, as well as numerous distinct processing platforms in any combination.

Also, numerous other arrangements of servers, clients, computers, storage devices or other components are possible in processing platform 400. Such components can communicate with other elements of the processing platform 400 over any type of network, such as a wide area network (WAN), a local area network (LAN), a satellite network, a telephone or cable network, or various portions or combinations of these and other types of networks.

Furthermore, it is to be appreciated that the processing platform 400 of FIG. 4 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the sensor data valuation and management system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   collecting data points from multiple infrastructure domains of at least one data center in a computing environment, wherein a first infrastructure domain comprises one or more compute components, a second infrastructure domain comprises one or more storage components, and a third infrastructure domain comprises one or more network components;

generating a sub-graphical representation from the collected data points that represents an infrastructure state of the at least one data center, wherein each vertex in the sub-graphical representation corresponds to one of the one or more compute components, the one or more storage components, and the one or more network components, and an edge connecting two vertices corresponds to a relationship between the components to which the vertices correspond;

sending the sub-graphical representation representing the infrastructure state of the at least one data center to an infrastructure generation engine;

generating a super-set graphical representation which is a composition of the sub-graphical representation and one or more other sub-graphical representations respectively representing the infrastructure state of one or more other data centers in the computing environment; and performing management operations of the multiple infrastructure domains based in part on the generated super-set graphical representation;

wherein the sub-graphical representation generating step further comprises generating one or more cross-domain weights from the collected data points for allowing traversals across the respective sub-graphical representations;

wherein the one or more cross-domain weights are generated based at least in part on combining utilization data for respective ones of the one or more compute components, the one or more storage components, and the one or more network components across two or more different graph layers of each of the respective sub-graphical representations associated with two or more different layers of a communication function model of the computing environment;

wherein the one or more cross-domain weights compress at least two of the two or more graph layers of each of the respective sub-graphical representations into a single view characterizing a limiting utilization factor across at least two of the two or more different layers of the communication function model of the computing environment, the limiting utilization factor being utilized for determining path cost minimization across the respective sub-graphical representations; and wherein the collecting, generating, sending, generating and performing steps are performed via one or more processing devices.

2. The method of claim 1, wherein the collected data points comprise temporal data points.

3. The method of claim 1, wherein the collected data points comprise spatial data points.

4. The method of claim 1, further comprising receiving a query directed the infrastructure state of the at least one data center.

5. The method of claim 4, further comprising traversing at least a portion of the sub-graphical representation to obtain information relevant to generating a response to the query.

6. The method of claim 5, further comprising generating a response to the query and sending the response to a source of the query.

7. The method of claim 6, wherein the source of the query is an operator of the at least one data center.

8. The method of claim 5, further comprising creating a lock on a set of one or more of the one or more compute components, the one or more storage components, and the one or more network components during generation of a response to the query.

9. The method of claim 1, further comprising generating a training data model for the at least one data center based on the sub-graphical representation and one or more snapshots of one or more components of the multiple domains.

10. A system, comprising:
at least one processor, coupled to a memory, and configured to:
collect data points from multiple infrastructure domains of at least one data center in a computing environment, wherein a first infrastructure domain comprises one or more compute components, a second infrastructure domain comprises one or more storage components, and a third infrastructure domain comprises one or more network components;

generate a sub-graphical representation from the collected data points that represents an infrastructure state of the at least one data center, wherein each vertex in the sub-graphical representation corresponds to one of the one or more compute components, the one or more storage components, and the one or more network components, and an edge connecting two vertices corresponds to a relationship between the components to which the vertices correspond;

send the sub-graphical representation representing the infrastructure state of the at least one data center to an infrastructure generation engine;

generate a super-set graphical representation which is a composition of the sub-graphical representation and one or more other sub-graphical representations respectively representing the infrastructure state of one or more other data centers in the computing environment; and perform management operations of the multiple infrastructure domains based in part on the generated super-set graphical representation;

wherein the sub-graphical representation generating step further comprises generating one or more cross-domain weights from the collected data points for allowing traversals across the respective sub-graphical representations;

wherein the one or more cross-domain weights are generated based at least in part on combining utilization data for respective ones of the one or more compute components, the one or more storage components, and the one or more network components across two or more different graph layers of each of the respective sub-graphical representations associated with two or more different layers of a communication function model of the computing environment; and wherein the one or more cross-domain weights compress at least two of the two or more graph layers of each of the respective sub-graphical representations into a single view characterizing a limiting utilization factor across at least two of the two or more different layers of the communication function model of the computing environment, the limiting utilization factor being utilized for determining path cost minimization across the respective sub-graphical representations.

11. The system of claim 10, wherein the at least one processor, coupled to the memory, is further configured to receive a query directed the infrastructure state of the at least one data center.

12. The system of claim 11, wherein the at least one processor, coupled to the memory, is further configured to traverse at least a portion of the sub-graphical representation to obtain information relevant to generating a response to the query.

13. The system of claim 12, wherein the at least one processor, coupled to the memory, is further configured to create a lock on a set of one or more of the one or more compute components, the one or more storage components, and the one or more network components during generation of a response to the query.

14. The system of claim 10, wherein the at least one processor, coupled to the memory, is further configured to generate a training data model for the at least one data center based on the sub-graphical representation and one or more snapshots of one or more components of the multiple domains.

15. An article of manufacture comprising a non-transitory processor-readable storage medium having encoded therein executable code of one or more software programs, wherein the one or more software programs when executed by one or more processing devices implement steps of:
 collecting data points from multiple infrastructure domains of at least one data center in a computing environment, wherein a first infrastructure domain comprises one or more compute components, a second infrastructure domain comprises one or more storage components, and a third infrastructure domain comprises one or more network components;
 generating a sub-graphical representation from the collected data points that represents an infrastructure state of the at least one data center, wherein each vertex in the sub-graphical representation corresponds to one of the one or more compute components, the one or more storage components, and the one or more network components, and an edge connecting two vertices corresponds to a relationship between the components to which the vertices correspond;
 sending the sub-graphical representation representing the infrastructure state of the at least one data center to an infrastructure generation engine;
 generating a super-set graphical representation which is a composition of the sub-graphical representation and one or more other sub-graphical representations respectively representing the infrastructure state of one or more other data centers in the computing environment; and
 performing management operations of the multiple infrastructure domains based in part on the generated super-set graphical representation;
 wherein the sub-graphical representation generating step further comprises generating one or more cross-domain weights from the collected data points for allowing traversals across the respective sub-graphical representations;
 wherein the one or more cross-domain weights are generated based at least in part on combining utilization data for respective ones of the one or more compute components, the one or more storage components, and the one or more network components across two or more different graph layers of each of the respective sub-graphical representations associated with two or more different layers of a communication function model of the computing environment; and
 wherein the one or more cross-domain weights compress at least two of the two or more graph layers of each of the respective sub-graphical representations into a single view characterizing a limiting utilization factor across at least two of the two or more different layers of the communication function model of the computing environment, the limiting utilization factor being utilized for determining path cost minimization across the respective sub-graphical representations.

16. The article of claim 15, further comprising receiving a query directed the infrastructure state of the at least one data center.

17. The article of claim 16, further comprising traversing at least a portion of the sub-graphical representation to obtain information relevant to generating a response to the query.

18. The article of claim 17, further comprising creating a lock on a set of one or more of the one or more compute components, the one or more storage components, and the one or more network components during generation of a response to the query.

19. The method of claim 1, wherein the communication function model of the computing environment comprises an Open Systems Interconnection (OSI) Network model, and wherein the at least two of the two or more different layers of the communication function model are associated with a physical layer and a data link layer of the OSI Network model.

20. The system of claim 10, wherein the communication function model of the computing environment comprises an Open Systems Interconnection (OSI) Network model, and wherein the at least two of the two or more different layers of the communication function model are associated with a physical layer and a data link layer of the OSI Network model.

* * * * *